United States Patent [19]

Yonezawa et al.

[11] Patent Number: 4,564,929
[45] Date of Patent: Jan. 14, 1986

[54] INFORMATION RECORDING AND REPRODUCING APPARATUS WITH TRACKING CONTROL BY SAMPLING

[75] Inventors: Seiji Yonezawa, Hachioji; Tatsuo Horikoshi, Toyokawa; Toshiaki Tsuyoshi, Kokubunji; Wasao Takasugi, Higashiyamato, all of Japan

[73] Assignee: Hitachi, Ltd., Tokyo, Japan

[21] Appl. No.: 443,871

[22] Filed: Nov. 23, 1982

[30] Foreign Application Priority Data

Nov. 25, 1981 [JP] Japan .................................. 56-187870
Aug. 16, 1982 [JP] Japan .................................. 57-141121

[51] Int. Cl.⁴ .............................................. G11B 7/08
[52] U.S. Cl. ......................................... 369/44; 369/33; 369/41; 369/46; 369/32
[58] Field of Search ................ 369/44, 46, 32, 33, 369/41, 109

[56] References Cited

U.S. PATENT DOCUMENTS

| 3,501,586 | 3/1970 | Russell | 369/44 |
| 3,891,794 | 6/1975 | Russell | |
| 3,919,697 | 11/1975 | Walker | 369/44 |
| 4,057,833 | 11/1977 | Braat | 369/46 |
| 4,408,314 | 10/1983 | Yokota | 369/46 |
| 4,467,462 | 8/1984 | Shibata | 369/46 |
| 4,475,183 | 10/1984 | Marchant et al. | 369/109 |

FOREIGN PATENT DOCUMENTS

| 0050967 | 5/1982 | European Pat. Off. . |
| 0072723 | 2/1983 | European Pat. Off. . |
| 2287817 | 5/1976 | France . |
| 2312087 | 12/1976 | France . |
| 2420182 | 10/1979 | France . |
| 2508218 | 12/1982 | France . |
| 54-19782 | 9/1980 | Japan . |
| 56-66473 | 11/1982 | Japan . |
| 56-84168 | 12/1982 | Japan . |

Primary Examiner—Raymond F. Cardillo, Jr.
Assistant Examiner—Alan K. Aldous
Attorney, Agent, or Firm—Antonelli, Terry & Wands

[57] ABSTRACT

An information recording and reproducing apparatus wherein a light beam is applied onto an optical disk having pits previously formed in optical manner thereon. A tracking signal is detected from the light beam which has been modulated by the pits, and information is recorded by applying a record beam modulated by an information signal onto an area between one pit and the succeeding pit while tracking is effected by using the tracking signal.

14 Claims, 15 Drawing Figures

INFORMATION RECORDING AND REPRODUCING APPARATUS WITH TRACKING CONTROL BY SAMPLING

BACKGROUND OF THE INVENTION

1. Field of the Invention

The present invention relates to an information recording and reproducing apparatus for an optical disk.

2. Description of the Prior Art

Hitherto, an apparatus is known wherein a DC track groove which is $\lambda/8$ in depth is previously formed on a disk, a tracking signal is detected by utilizing the fact that asymmetry in diffracted light beam is caused by the edge of the track groove when the light spot gets out of the center of the track, and the information is recorded on the DC track groove by the laser light which is modulated by an information signal while a track is being traced by using the above-described tracking signal. In this apparatus, two photodetectors arranged in parallel with the track receive diffracted light beam and a tracking signal is detected by deriving the difference between the outputs of these two photodetectors. Such an apparatus has been disclosed in the Japanese Patent Application Laid-Open No. 60702/74.

If the light spot in this apparatus is moved by a galvanomirror, for example, for tracking control, a tracking offset is produced in the tracking signal. Further, the coma aberration is produced when a disk is tilted. Due to this coma aberration, especially two photodetectors which are arranged in parallel with the track become out of balance, generating more track offsets. Accordingly, normal track tracing is not conducted. This tracking signal is represented by the function of the DC groove on the disk, i.e., the depth and width of the groove, wavelength and distribution of the light beam and the numerical aperture of the lens.

FIG. 10 shows a tracking signal obtained when a light spot gets out of the center of a DC groove in a conventional apparatus.

As for the parameters of the disk and optical system, the wavelength $\lambda = 0.82$ $\mu$m, groove depth $= [/8$, groove width $= 0.45$ $\mu$m, track pitch $= 1.6$ $\mu$m, numerical aperture of lens $= 0.5$, distribution coefficient $\gamma^2 = 4$, and $\theta = 0.5°$. As evident from FIG. 10, the tracking offset is 0.08 $\mu$m in this case. Experiments shows that the offset as much as 0.08 $\mu$m loses the stable tracking control.

Further, the conventional apparatus has the following problems. When a disk having the information recorded at high density on its DC groove is reproduced, the tracking offset is increased due to a lowered tracking sensitivity. In addition, in a conventional DC groove system having a groove $\lambda/8$ deep, the selectable range of recording material is narrowed and the application range is limited. That is to say, the tracking signal becomes unstable by the irregularity of the reflectivity, unevenness or the irregularity of the refractive index of the disk.

SUMMARY OF THE INVENTION

In view of the above described points, the present invention is provided. The object of the present invention is to provide an information recording and reproducing apparatus wherein all of the above described problems in the prior art are resolved, stable tracking control can be accomplished irrespective of the recording material of the disk, and therefore stable information recording and reproduction can be realized.

To achieve the object, in accordance with the present invention, synchronization or pre-pits for tracking are previously recorded on a disk, a tracking signal is detected from the synchronization or pre-pits, and an information signal is recorded between successive synchronization or pre-pits while tracking is being effected using the tracking signal.

DESCRIPTION OF THE PREFERRED EMBODIMENTS

Figure 1A:
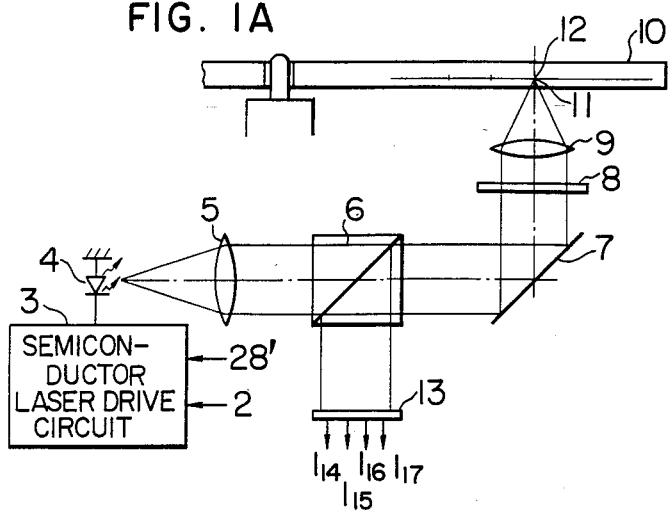
FIG. 1A shows an optical system for recording and reproducing information on an optical disk.
Figure 1B:
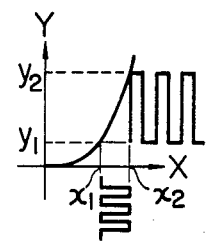
FIG. 1B illustrates the principle of operation of driving of a semiconductor laser.
Figure 2:
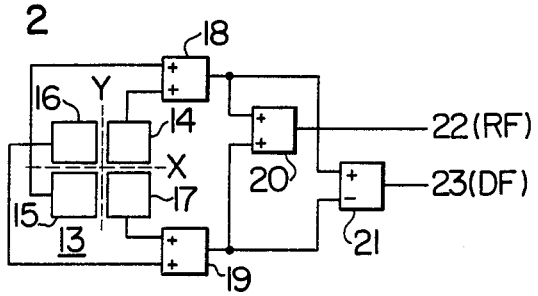
FIG. 2 shows the construction of a photodetector.
Figure 6:
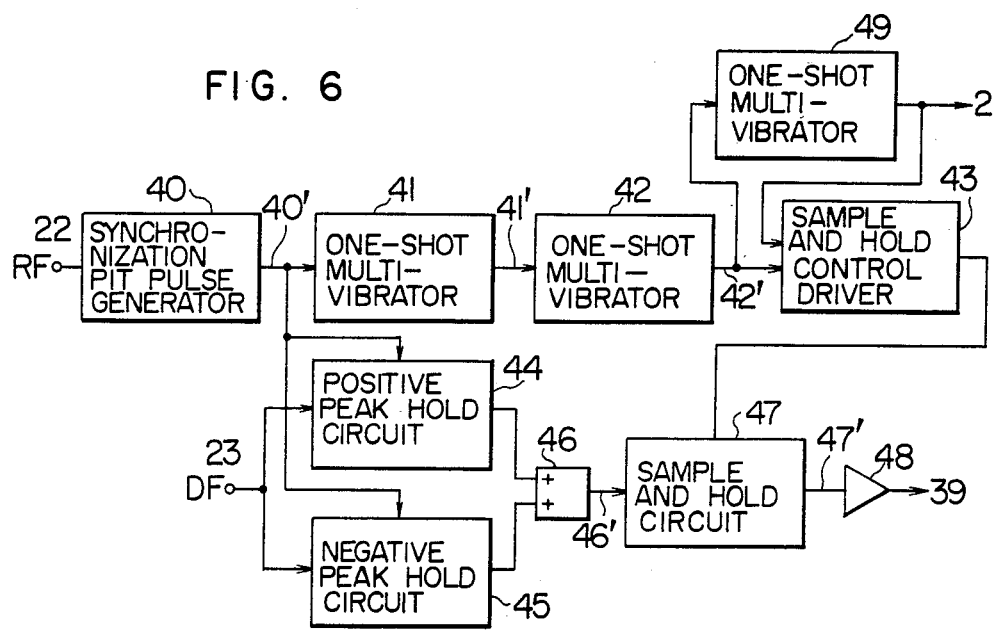
FIG. 6 and FIG. 7 are drawings for illustrating another embodiment of the present invention.

FIG. 1A illustrates the construction of an optical system for recording and reproducing information on and from an optical disk. FIG. 1B illustrates the driving principle of the semiconductor laser. In the semiconductor laser, it is possible to swing the output level of the laser light quantity (ordinate) from $y_1$ to $y_2$ by applying the pulse modulation to the drive current level (abscissa) in the range from $x_1$ to $x_2$. The semiconductor laser is driven at the output level $y_1$ of laser light quantity in reproduction and at the output level $y_2$ of laser light quantity in recording. In FIG. 1A, numeral 3 denotes a drive circuit for a semiconductor laser which feeds modulation pulses 28' to the laser 4 when a write timing pulse 2 is applied. The light emitted from the laser 4 forms a light spot 11 on a track 12 on a disk 10 via a coupling lens 5, a polarizing prism 6, a galvanomirror 7, a quarter wavelength plate 8 and an object lens 9. The reflected light diffracted by the track 12 returns to the above described optical system again. It is reflected by the polarized prism 6 due to the polarization effect of the quarter wavelength plate 8 and is received by a photodetector 13 which is divided into four sections. FIG. 2 shows the construction of the photodetector for obtaining the tracking signal from the photodetector 13 and a signal processing circuit. In FIG. 2, the origin of the photodetector is aligned with the light axis of the optical system (FIG. 1A), the X axis is placed in parallel with the track direction, and the Y axis is placed perpendicular to the track. Output signals $I_{14}$, $I_{16}$, $I_{15}$ and $I_{17}$ are taken out respectively from photodetectors 14, 16, 15 and 17 which exist respectively in the first, second, third and fourth quadrants. A signal DF represented as $$DF = (I_{14} + I_{15}) - (I_{16} + I_{17})$$

is produced by adder circuits 18 and 19 as well as a subtractor circuit 21. A signal RF represented as $$RF = (I_{14} + I_{15}) + (I_{16} + I_{17})$$

is produced by adder circuits 18, 19 and 20. The RF signal and DF signal are fed to a circuit as shown in FIG. 4 or FIG. 6 to yield the tracking signal.

Figure 3:
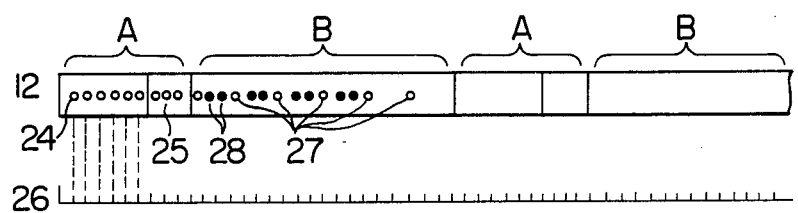
FIG. 3 shows an example of a track with information recorded thereon according to the present invention.

FIG. 3 shows an example of track with information recorded thereon in accordance with the present invention. The track 12 is composed of two kinds of blocks A and B. The block A is composed of sync pits 24 for phase locking and sync pattern pits 25 for determining the origin of the data block B. From the sync pits 24 and sync pattern pits 25, a train of timing pulses 26 is produced. By using the timing pulses 26 and synchronization pits 27 recorded on the data block B, information pits 28 are correctly recorded between the synchronization pits 27. When reproducing the information, the timing pulses 26 and the data block B are derived from the sync pits 24 and the sync pattern pits 25, and the information pits 28 and the synchronization pits 27 are reproduced separately.

Figure 4:
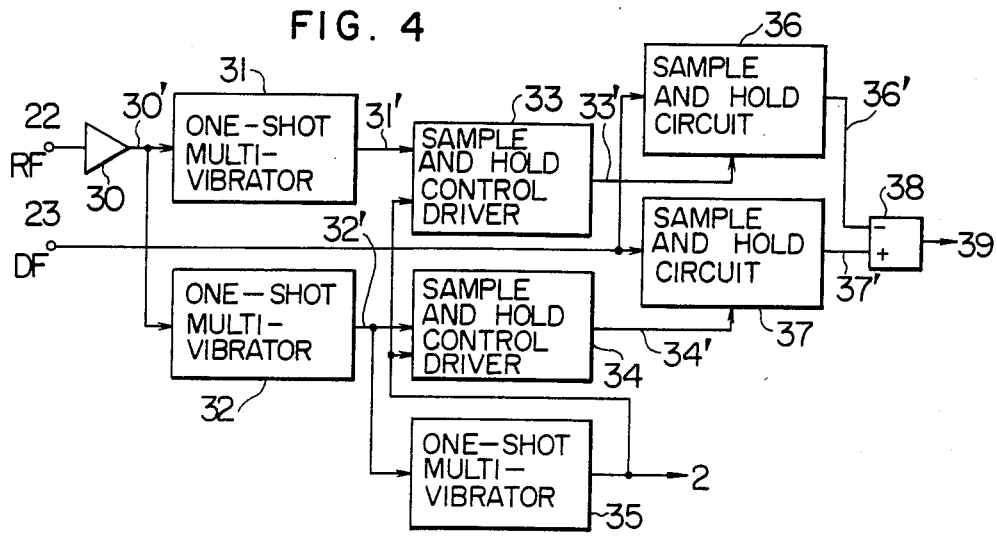
FIG. 4 and FIG. 5 are drawings for illustrating an embodiment of the present invention.
Figure 5:
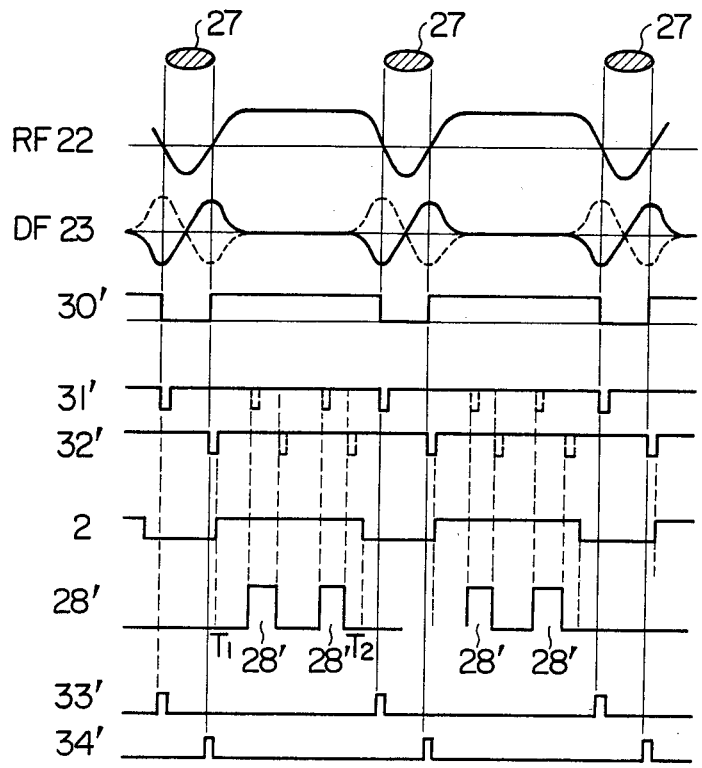

FIG. 4 is a block diagram of a circuit for deriving the tracking signal from the synchronization or pre-pit. FIG. 5 is a drawing for illustrating the operation of the circuit shown in FIG. 4 and shows output waveforms of respective blocks. When the laser spot 11 is successively applied to the synchronization or pre-pits 27 on the track 12, the quadrant photodetectors 14, 15, 16 and 17 respectively produce signals $I_{14}$, $I_{15}$, $I_{16}$ and $I_{17}$. The sum signal $RF = (I_{14} + I_{15}) + (I_{16} + I_{17})$ and the difference signal $DF = (I_{14} + I_{15}) - (I_{16} + I_{17})$ have waveforms as shown in FIG. 5. The level of the RF signal 22 is lowered at the synchronization pits 27 because of diffraction. The DF signal 23 has one of two alternative waveforms which are 180° apart in phase depending upon the direction in which the light spot 11 gets out of the center of the track (a train of synchronization pits). The waveform of the DF signal 23 assumes the zero value at the center of a synchronization pit 27 and presents the peak at both ends of the pit. The method of obtaining the tracking signal from the RF signal 22 and the DF signal 23 and the method of recording the information pit 28 on the intermediate area between the synchronization pits 27 will be described in the following.

The RF signal 22 undergoes waveform shaping in a waveform shaper 30 to yield an output 30'. One-shot multivibrators 31 and 32 produce edge pulses 31' and 32' which indicate the edge positions of the synchronization pit 27. The level of the DF signal 23 at that time is sampled and held by sample and hold circuits 36 and 37. A subtractor circuit 38 produces the difference between outputs 36' and 37' respectively from the sample and hold circuits 36 and 37 to yield a tracking signal 39. The tracking signal 39 drives the galvanomirror 7 shown in FIG. 1 to position the light spot 11 on the center of the track 12. On the other hand, for the purpose of recording an information pit 28 on the intermediate area between successive synchronization pits 27 by using the modulation pulse 28', a one-shot multivibrator 35 produces a write timing pulse 2 by using the edge pulse 32' which is generated at one end of the synchronization pit 27. The resultant write timing pulse 2 defines a time period ranging from $T_1$ to $T_2$ during which the modulation pulse 28' is to be recorded. Further, in order to prevent the modulation pulse 28' from disturbing the tracking signal 39 during the time period $T_1$ to $T_2$ for information writing, the outputs 36' and 37' from the sample and hold circuits are held. For this purpose, the write timing pulse 2 turns outputs of sample and hold control drivers 33 and 34 to zero in order to hold the sampled outputs.

Thus, it becomes possible to write the information pit 28 on the intermediate area between successive synchronization pits 27 while detecting the tracking signal from the synchronization pits 27.

Figure 8:
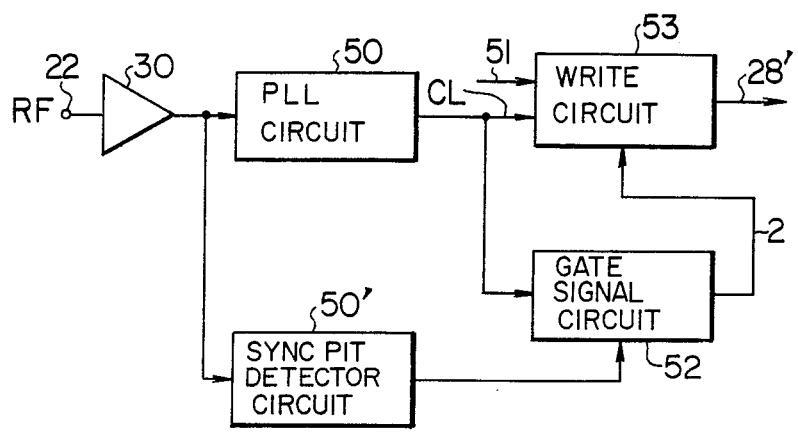
FIG. 8 is a drawing for illustrating still another embodiment of the present invention.

Succeedingly, another example of write operation for the information pit 28 will be described referring to a block diagram shown in FIG. 8. The information pit 28 is to be written on the intermediate area between successive synchronization pits 27 which have been previously formed. As a write control timing signal, therefore, the signal reproduced from the synchronization pit 27 is applied to a PLL (Phase Lock Loop) circuit 50 to produce a write clock CL. The write clock CL has a repetition period which is integral multiples of that of the synchronization pit and is synchronized in phase with the synchronization pit. By using the above described write clock CL and the synchronization pit information fed from a synchronization pit detector circuit 50', a gate signal circuit 52 produces the write timing signal 2 which indicates an area on which the information pit can be written. The written information pit is determined by the data pattern to be written and the modulation scheme. When one bit data is written between two successive synchronization pits in the easiest and simplest modulation scheme, for example, one information pit 28 is formed between two successive synchronization pits for data "1" and any information pit 28 is not formed for data "0". Although this scheme facilitates encoding and decoding in write and read operation, it is evident that the information recording density (quantity of data which can be recorded on a specified length) cannot be raised. In practice, therefore, a plurality of data bits with the fixed or variable length are modulated as a group to form information pit(s) 28. The modulation scheme is not limited to one particular scheme and various modulation schemes can be conceived depending upon the application and object. The write timing signal 2 indicating an area on which the information pit can be recorded excluding the portion for the synchronization pit 27, the write clock CL, and an information signal 51 are applied to a write circuit (modulation circuit) 53 to produce modulation pulse 28', thus the information pits are written on the recordable area according to the modulation scheme.

Data are written by using a write pulse having a greater power as compared with read operation as shown in FIG. 1B. It is a matter of fact that a reflected signal from the disk due to the write pulse is applied to the above described tracking signal detection system. Thus, it is desirable to prevent the influence from the write pulse for stabilizing the tracking control characteristics. Since the tracking signal is, according to the present invention, obtained from synchronization pits (refer to FIG. 4), it is not necessary to obtain the tracking signal from a portion having no synchronization pits, i.e., the aforementioned recordable area. On the other hand, the write pulse is generated only in a recordable area. Accordingly, it is possible to use the above described write timing signal 2 for obviating the write pulse from affecting the tracking signal system. This is accomplished by, for example, maintaining the tracking information produced from the synchronization pit 27 in the hold state while the above described write timing signal 2 exists.

Figure 7:
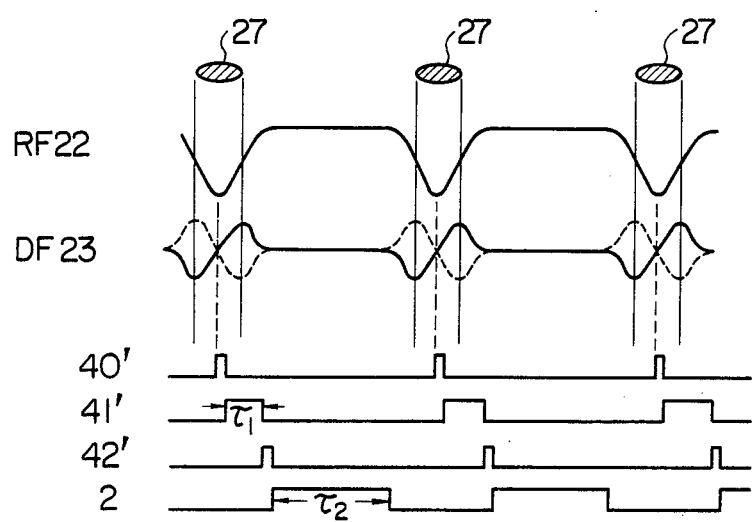

FIG. 6 and FIG. 7 show another embodiment according to the present invention. At the minimum value of the RF signal 22, i.e., at the center of a pit, a circuit 40 which is composed of a delay line, comparator, one-shot multivibrator and so on yields an output 40'. This pulse 40' is used as reset pulses for a positive peak hold circuit 44 and a negative peak hold circuit 45. From the time when this reset pulse 40' is outputted, the DF signal 23 is subjected to peak holding. On the other hand, a one-shot multivibrator 41 produces a pulse 41' which is $\tau_1$ in duration. A one-shot multivibrator 42 yields a control pulse 42' for a sample and hold circuit 47. It is possible to obtain the peak value of the DF signal 23 by equalizing the duration $\tau_1$ of the pulse 41' to that of the synchronization bit 27. As evident from the DF signal 23 illustrated in FIG. 7, either the positive peak hold circuit 44 or the negative peak hold circuit 45 operates according to the direction in which the laser spot 11 deviates from the center of the track 12. That is to say, the output 46' of an adder 46 represents the magnitude and direction of the deviation of the laser spot 11 from the center of the track 12. Therefore, it is possible to obtain the tracking signal 39 by applying sample and hold function to the adder output 46' in the sample and hold circuit 47 at the timing of the sample and hold control pulse 42'. Numeral 48 denotes an amplifier for amplifying the output 47' of the sample and hold circuit 47. On the other hand, for recording the information pit 28 between two successive synchronization pits 27 by using the modulation pulse 28', a one-shot multivibrator 49 produces the write timing pulse 2 from the sample and hold control pulse 42'. The duration $\tau_2$ of the pulse 2 is a time period for recording the modulation pulse 28'. For preventing the modulation pulse 28' from disturbing the tracking signal 39 during the information write time period $\tau_2$, the output of a sample and hold control driver 43 is suppressed by the write timing pulse 2 in the same way as the preceding example. Thus, it is possible to write the information pit on the intermediate area between two successive synchronization pits while producing the tracking signal from the synchronization pit in the same way as the previously described embodiment.

Figure 9:
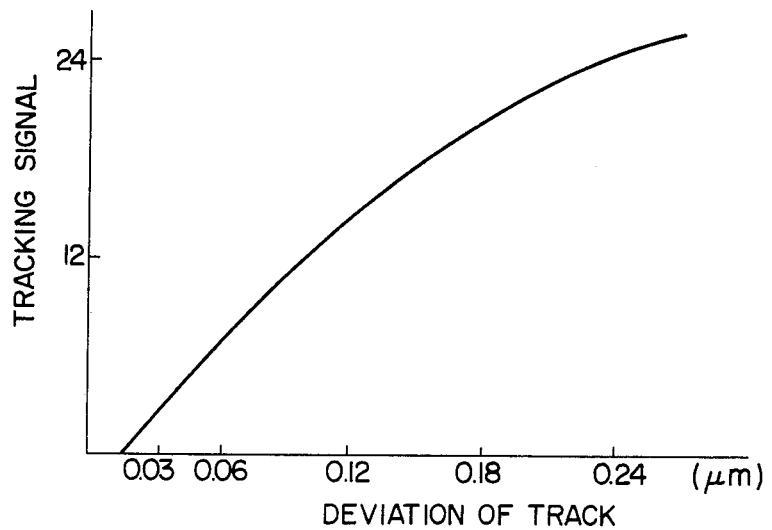
FIG. 9 and FIG. 10 show the relationship between the track deviation and the tracking signal respectively for the present invention and the prior art.

FIG. 9 shows the relationship between the tracking signal and the tracking deviation in accordance with the present invention. As seen from FIG. 9, even if the disk is tilted by 0.8°, the offset is less than 0.03 $\mu$m. As a result, stable tracking control is possible.

As heretofore described, it is possible to derive the tracking signal 39 from the synchronization pit 27, sample and hold the tracking signal 39 until the succeeding synchronization pit 27, and write the information pit 28 on the intermediate area between the two synchronization pits 27.

Reproduction of a signal is effected by focusing laser light beam on the pit train as shown in FIG. 3. Output signals from the sync pit 24, sync pattern bit 25 and synchronization pit 27 at the time of reproduction are exactly the same as those at the time of recording. Only the waveform from the information pit 28 is different from that at the time of recording. Therefore, signal reproduction is carried out by the same technique as illustrated in FIG. 4 and FIG. 5.

That is to say, from the sync pit 24 and the sync pattern pit 25, the timing pulse 26 and the data block B are derived, and then the signal from the synchronization pit 27 is separated from the signal from the information pit 28. Thus, the information is reproduced while the tracking signal is being detected from the synchronization pit 27.

There are two alternative methods for separating the signal reproduced from the synchronization pit 27 from the signal reproduced from the information pit 28.

The first method is composed of, as illustrated in FIG. 5, producing the write timing signal 2, detecting the information pit 28 by utilizing this timing pulse, and separating the information pit from the synchronization pit 27.

The second method is especially useful when the polarity of the signal from the synchronization pit 27 is reverse to that of the signal from the information pit 28. If a recording material such as that having tri-structure (*IEEE Journal of Quantum Electronics*, Vol. QE 17, No. 1, January 1981, p.p. 69-77) is used, the waveform of the information pit 28 has a reversed polarity as compared with the sync pit 24, the sync pattern pit 25 and the synchronization pit 27. By using the difference in polarity, it is possible to separate the output waveform of the synchronization pit 27 in the reproduced output waveform of the disk from that of the information pit 28 and then to obtain the tracking signal from the synchronization pit 27.

According to the present invention, there is obtained another useful method for deriving the tracking signal from an optical disk whose recording material is such as a tellurium compound, a pigment or bubble forming media recording material. Such an optical recording material is described in "Bubble forming media", CLEO 198, Washington D.C. June 11, 1981. When such an optical recording material is employed, the waveform of the signal reproduced from the information pit 28 has the same polarity as that of the output signal waveform reproduced from pits which have been previously recorded on the disk, i.e., the sync pit 24, the sync pattern pit 25 and the synchronization pit 27. In addition, the signal reproduced from the information pit 28 also includes the tracking signal.

Figure 11:
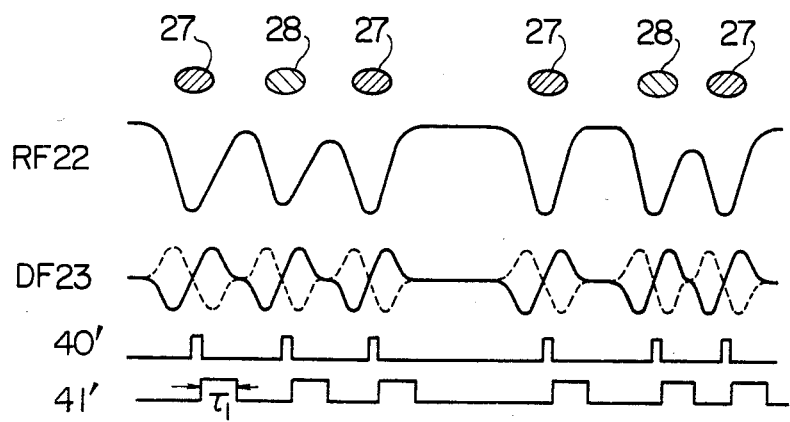
FIG. 11 is a waveform diagram for illustrating operation in another embodiment of the present invention.

Therefore, the method wherein the tracking signal is derived without discriminating the synchronization pit from the information pit is especially effective to an apparatus using a so-called two-spot type optical head wherein the read light spot (R spot) is separated from the write light spot (W spot). In the two-spot scheme, the R spot is placed after the W spot on the same track as a short distance and the information which has been recorded at the preceding W spot is immediately read out at the succeeding R spot to determine whether the information has been correctly recorded, resulting in highly reliable read/write operation. If the tracking signal is derived from the R spot system in the two-spot scheme, the W spot exerts no influence upon the R spot. Accordingly, the R spot system always stays in the read state. If the tracking signal can be obtained without discriminating the synchronization pit from the information pit, the aforementioned operation to extract only the information pit becomes entirely unnecessary. The principle of tracking signal detection in accordance with the present invention exists in determining whether a pulse signal produced at an edge of the pit corresponds to the front edge or rear edge. Also in the aforementioned two-spot scheme, it is possible to sample the differential signal DF 23 by the signal 41' as shown in FIG. 7. FIG. 11 shows the operation in that case. The sum signal RF 22 from the photodetector represents the similar waveform respectively for the synchronization pit 27 and the information pit 28. The peak detector circuit, which detects in this case a negative peak, produces a peak pulse 40' corresponding to a center of a pit in the waveform. From the peak pulse 40', a pulse 41' which was the width covering the rear edge of a pit is produced. At this time, the difference signal DF 23 also represents the similar waveform respectively for the synchronization pit 27 and the information pit 28. That it is to say, the waveform polarity of the differential pulse DF 23 is determined according to the direction in which the R spot is deviated from the center of the above described pit, i.e., the left or right. Therefore, if the pulse 41' is adopted as a sampling pulse, the peak value of the differential signal DF 23 during the duration $\tau_1$ of the sampling pulse is detected and the detected peak value is held during the remaining time period, this detected peak value can be used as the tracking signal. Since the differential signal DF 23 may have either of positive and negative polarities, a peak hold circuit is provided for each of positive polarity and negative polarity. And the outputs of these peak hold circuits are synthesized to produce the tracking signal. As described above, this operation is the same as that in case of FIG. 6 excepting that sampling is effected in an area corresponding to an information pit 28 as well. Accordingly, the circuit is also the same as that shown in FIG. 6. However, masking of the information pit area is not necessary. Therefore, the signals including numerals 42' and 2 and the circuits for producing these signals are eliminated. Instead, the output signal 41' of one-shot multivibrator 41 may be used as an input signal i.e., sampling pulse for sample and hold circuit 47.

Figure 12:
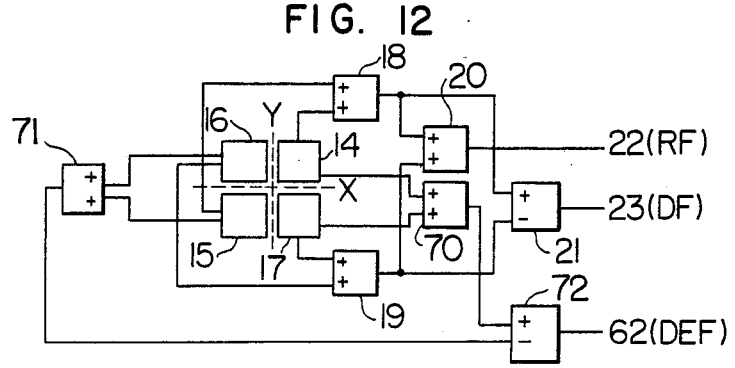
FIG. 12 and FIG. 13 are block diagrams for illustrating further still another embodiment of the present invention.

FIG. 17 shows another example of the construction of a photodetector for obtaining a tracking signal from the photodetector 13 together with the signal processing circuit thereof. In FIG. 12, the origin of the photodetector is aligned with the light axis of the optical system (FIG. 1A), the X axis is placed in parallel with the track direction, and the Y axis is placed perpendicular to the track. Output signals $I_{14}$, $I_{16}$, $I_{15}$ and $I_{17}$ are taken out respectively from photodetectors 14, 16, 15 and 17 which exist respectively in the first, second, third and fourth quadrants. A signal DF represented as $$DF=(I_{14}+I_{15})-(I_{16}+I_{17})$$

is produced by adder circuits 18 and 19 as well as a subtractor circuit 21. A signal RF represented as $$RF=(I_{14}+I_{15})+(I_{16}+I_{17})$$

is produced by adder circuits 18, 19 and 20.
In addition, a difference signal DEP represented as $$DEF=(I_{14}+I_{17})-(I_{15}+I_{16})$$

is produced by adder circuits 70 and 71 as well as a subtractor circuit 72.

Figure 13:
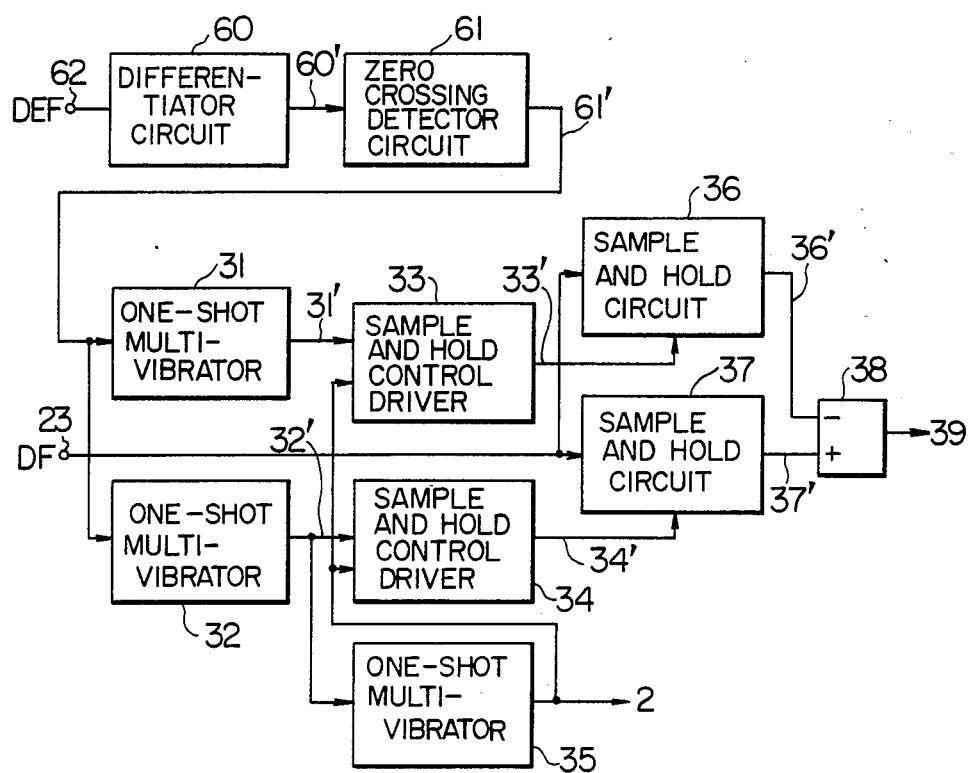

The RF signal, DEF signal and DF signal are fed to a circuit as shown in FIG. 13.

Figure 14:
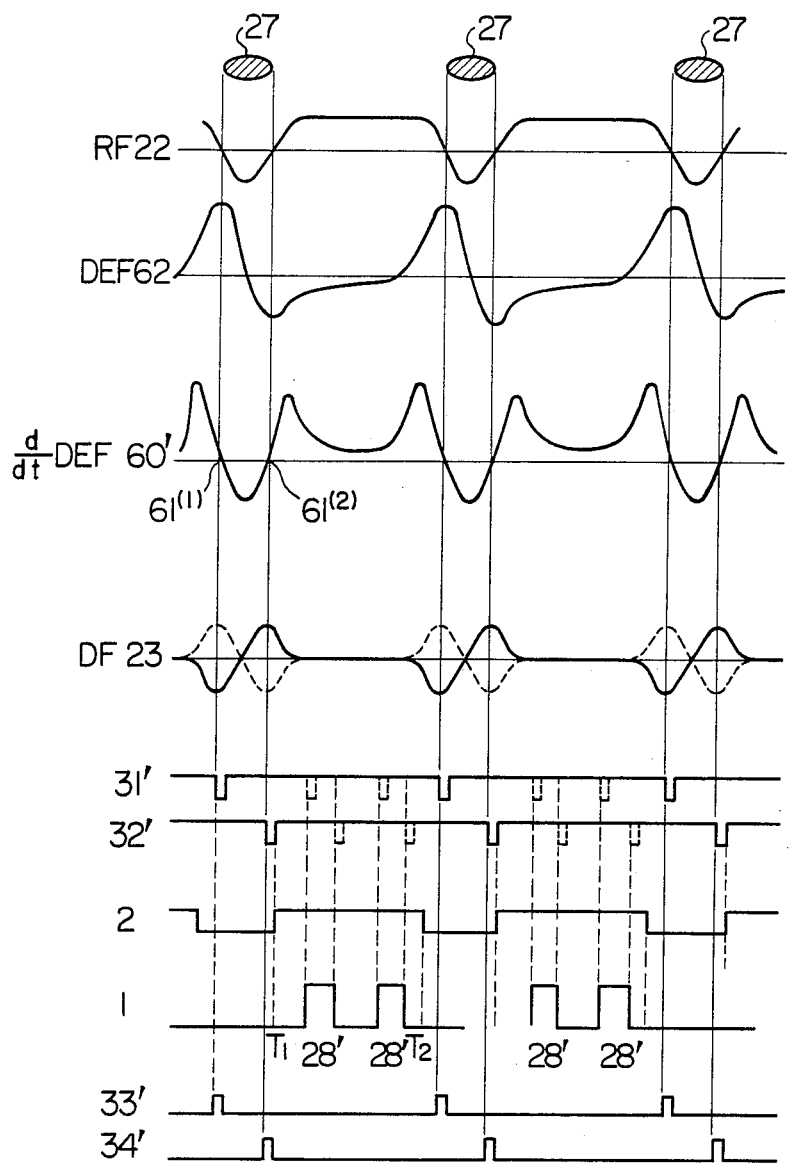
FIG. 14 is a waveform diagram for illustrating the operation in blocks shown in FIG. 12 and FIG. 13.

FIG. 13 is a block diagram of a circuit for deriving the tracking signal from the synchronization pit. FIG. 14 is a drawing for illustrating the operation of the circuit shown in FIG. 13 and shows output waveforms of respective blocks. When the laser spot 11 is successively applied to the synchronization pits 27, the quadrant photodetectors 14, 15, 16 and 17 respectively produce signals $I_{14}$, $I_{15}$, $I_{16}$ and $I_{17}$. The sum signal $RF=(I_{14}+I_{15})+(I_{16}+I_{17})$, the difference signal $DEF=(I_{14}+I_{17})-(I_{15}+I_{16})$ and the difference signal $DF=(I_{14}+I_{15})-(I_{16}+I_{17})$ have waveforms as shown in FIG. 14. The level of the RF signal 22 is lowered at the synchronization pits 27 because of diffraction. The DEF signal 62 has peaks at both ends of a synchronization pit 27 and its waveform is silimar to that obtained by differentiating the RF signal. The DF signal 23 has one of two alternative waveforms which are 180° apart in phase depending upon the direction in which the light spot 11 gets out of the center of the track. In addition, the waveform of the DF signal 23 assumes the zero value at the center of the synchronization pit 27 and presents the peak at both ends of the pit. The DEF signal 62 is differentiated by a differentiator circuit 60 to yield an output 60'. The differentiated output 60' is applied to a zero crossing detector circuit 61, zero points $61^{(1)}$, $61^{(2)}$ and so on being detected. Subsequently, one-shot multivibrators 31 and 32 produce edge pulses 31' and 32' which indicate positions of zero points $61^{(1)}$, $61^{(2)}$ and so on, i.e., positions of edges of the synchronization pits 27. Sample and hold circuits 36 and 37 effect sample and hold function to the level of the DF signal 23 at the time of edge pulse occurrence. A subtractor circuit 38 produces the difference between outputs 36' and 37' respectively from the sample and hold circuits 36 and 37 to yield a tracking signal 39. This tracking signal 39 drives the galvanomirror 7 shown in FIG. 1 to position to light spot 11 on the center of the track 12. On the other hand, for the purpose of recording an information pit 28 on the intermediate area between successive synchronization pits 27 by using the modulation pulse 28', a one-shot multivibrator 35 produces a write timing pulse 2 by using the edge pulse 32' which is generated at one end of the synchronization pit 27. The resultant write timing pulse 2 defines a time period ranging from $T_1$ to $T_2$ during which the modulation pulse 28' is to be recorded. Further, in order to prevent the modulation pulse 28' from disturbing the tracking signal 39 during the time period $T_1$ to $T_2$ for information writing, the outputs 36' and 37' from the sample and hold circuits are held. For this purpose, the write timing pulse 2 turns outputs of sample and hold control drivers 33 and 34 to zero in order to hold the sampled outputs.

Thus, it becomes possible to write the information pit 28 on the intermediate area between successive synchronization pits 27 while detecting the tracking signal from the synchronization pits 27.

Figure 10:
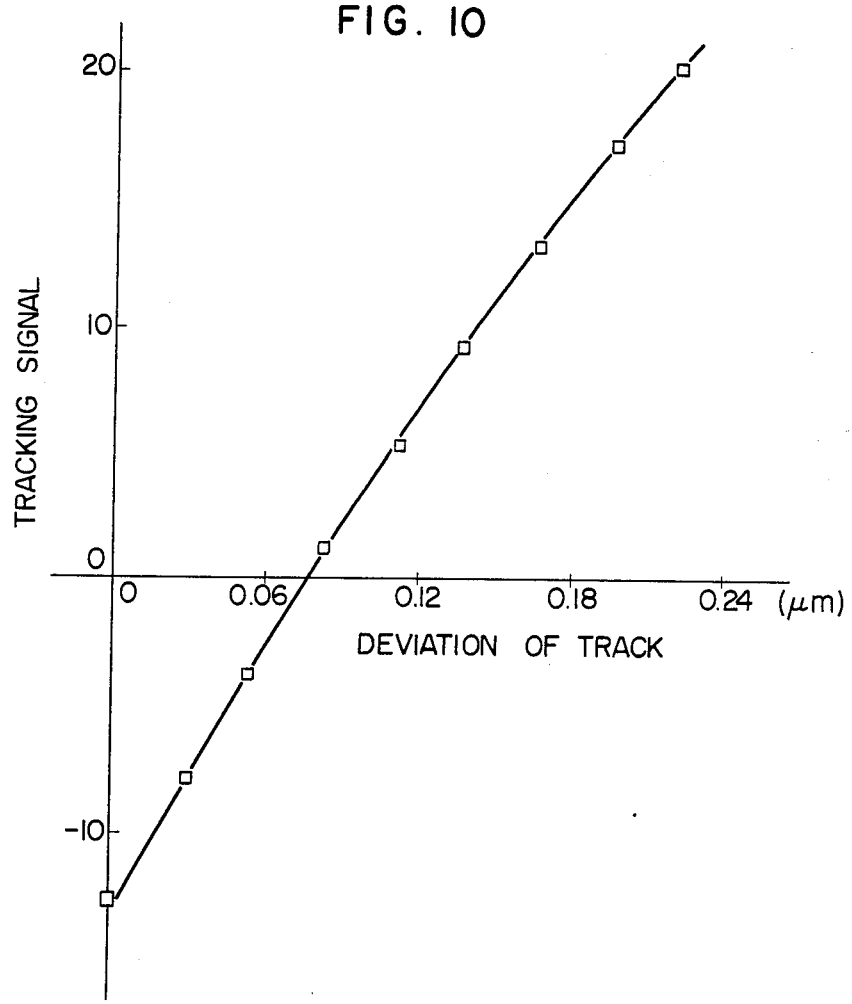

FIG. 10 shows data for a conventional DC groove $\lambda/8$ deep. Comparing FIG. 10 with FIG. 9 clarifies the significant effect according to the present invention.

As detailed heretofore, by means of the information recording and reproducing method in accordance with the present invention, it becomes possible to record information on a disk at high density and read correctly the information which has been recorded on the disk at high density. This represents a great advance in application fields such as a digital disk and a digital audio disk. In accordance with the present invention, it is possible to eliminate a problem in the aforementioned conventional method wherein information is recorded on the DC groove having the depth of λ/8, i.e., a problem that the tracking offset is large when the disk is tilted. Further, it is also possible to resolve a problem that the tracking offset is increased when the disk with information recorded at high density on the DC groove thereof is reproduced because of its lowered tracking sensitivity. In addition, in the conventional method wherein the DC groove having the depth of λ/8 is formed, the range of selectable recording materials is narrowed and the application range is limited. According to the present invention, a tracking signal can be extracted from synchronization pits that are recorded in many forms, for example, in the form of a difference in reflectivity, unevenness, or a difference in refractive index. Thus, it is possible to select recording materials out of wide range of materials.

Further, since the high precision mechanism is not required, an inexpensive apparatus can be obtained.

It is a matter of fact that the present invention is not restricted to the above described embodiments and various modifications are permissible. For instance, the track formed on the disk is not limited to the spiral form. The concentric circles may also be adopted. Further, for recording information on the disk, a combination of an external modulator and gas laser may be used instead of the semiconductor laser. In addition, the method for recording a synchronization detection signal is not limited to that used in the above described embodiments. It is also possible to record another time-synchronization pulse between successive synchronization pits and record information without causing phase deviation by using this time-synchronization pulse.

We claim:

1. An information recording and reproducing apparatus including:
    an optical disc having synchronization pits previously formed on a record medium in such a manner as to permit optical detection, said synchronization pits forming a track in the rotation direction of said optical disc;
    means for applying a light beam onto said optical disc through an optical system;
    photo detecting means including a photoreceptive member for receiving said light beam reflected by said optical disc, said photoreceptive member being divided into four detection elements each disposed in the first to fourth quadrants defined by an origin coinciding with the light axis of said optical system, an axis in parallel with said track, and an axis perpendicular to said track;
    first means for producing a difference signal representing the difference between a signal which is the sum of the output signal from the detection element in said first quadrant and the output signal from the detection element in said third quadrant and a signal which is the sum of the output signal from the detection element in said second quadrant and the output signal from the detection element in said fourth quadrant;
    second means coupled to said first means, for producing a tracking signal on the basis of the level of said difference signal at the edges of said synchronization pits, said tracking signal being used to track said synchronization pits along said track;
    third means coupled to said second means, for controlling, in response to said tracking signal, the application position of said light beam so as to track said synchronization pits along the track;
    fourth means for modulating said light beam by predetermined information within a time period during which said light beam is applied onto an area between one of said synchronization pits and the succeeding synchronization pit;
    said second means including:
    fifth means for producing pulse signals each representing respective edges of each of said synchronization pits on the basis of the output signals of said photoreceptive member;
    sixth means coupled to said fifth and first means, for deriving the level of said difference signal at each time point at which respective pulse signals of said fifth means are produced; and
    seventh means coupled to said sixth means, for deriving the difference between said derived levels as said tracking signal; and said fifth means comprises:
    eighth means for generating pulse signals indicative of the length in the track direction of said synchronization pits on the basis of the sum of the output signals of said detection elements in said first to fourth quadrants; and
    ninth means, coupled to said eighth means, for generating pulse signals each at respective rise time and fall time points of said pulse signals of said eighth means.

2. An information recording and reproducing apparatus according to claim 1, further comprising tenth means for generating a gate signal indicative of an area for recording said information by using the output of said photoreceptive member within a time period during which said light beam is applied onto an area between said synchronization pits, wherein said tracking signal is held by using said gate signal.

3. An information recording and reproducing apparatus according to claim 1, wherein said sixth means includes a sample and hold circuit, the pulse signal of said fifth means being a sampling control signal for said sample and hold circuit.

4. An information recording and reproducing apparatus including:
    an optical disc having synchronization pits previously formed on a record medium in such a manner so as to permit optical detection, said synchronization pits forming a track in the rotation direction of said optical disc;
    means for applying a light beam onto said optical disc through an optical system;
    photo detecting means including a photoreceptive member for receiving said light beam reflected by said optical disc, said photoreceptive member being divided into four detection elements each disposed in the first to fourth quadrants defined by an origin coinciding with the light axis of said optical system, an axis in parallel with said track, and an axis perpendicular to said track;
    first means for producing a difference signal representing the difference between a signal which is the sum of the output signal from the detection element in said first quadrant and the output signal from the detection element in said third quadrant and a signal which is the sum of the output signal from the detection element in said second quadrant and the output signal from the detection element in said fourth quadrant;

second means coupled to said first means, for producing a tracking signal on the basis of the level of said difference signal at the edges of each of said synchronization pits, said tracking signal being used to track said synchronization pits along said track;

third means coupled to said second means, for controlling, in response to said tracking signal, the application position of said light beam so as to track said synchronization pits along the track;

fourth means for modulating said light beam by predetermined information within a time period during which said light beam is applied onto an area between one of said synchronization pits and the succeeding synchronization pit;

said second means including:

fifth means for producing pulse signals representing respective edges of each of said synchronization pits on the basis of the output signals of said photoreceptive member;

sixth means coupled to said fifth and first means, for deriving the level of said difference signal at each time point at which respective pulse signals of said fifth means are produced; and seventh means coupled to said sixth means, for deriving the difference between said derived levels as said tracking signal;

eighth means for generating a gate signal indicative of an area for recording said information by using the output signals of said photoreceptive member within a time period during which said light beam is applied onto an area between said synchronization pits, wherein said tracking signal is held by using said gate signal; and ninth means provided between said fifth and sixth means and also coupled to said eighth means, said ninth means being constructed so that the pulse signals of said fifth means are not supplied to said sixth means within a time period during which the gate signal of said eighth means is generated.

5. An information recording and reproducing apparatus including:

an optical disc having synchronization pits previously formed on a record medium in such a manner as to permit optical detection, said synchronization pits forming a track in the rotation direction of said optical disc;

means for applying a light beam onto said optical disc through an optical system;

photo detecting means including a photoreceptive member for receiving said light beam reflected by said optical disc, said photoreceptive member being divided into four detection elements each disposed in the first fourth quadrants defined by an origin coinciding with the light axis of said optical system, an axis in parallel with said track, and an axis perpendicular to said track;

first means for producing a difference signal representing the difference between a signal which is the sum of the output signal from the detection element in said first quadrant and the output signal from the detection element in said third quadrant and a signal which is the sum of the output signal from the detection element in said second quadrant and the output signal from the detection element in said fourth quadrant;

second means, coupled to said first means, for producing a tracking signal on the basis of said difference signal, said tracking signal being used to track said synchronization pits along said track;

third means, coupled to said second means, for controlling in response to said tracking signal, the application position of said light beam so as to track said synchronization pits along the track;

fourth means for modulating said light beam by predetermined information within a time period during which said light beam is applied onto an area between one of said synchronization pits and the succeeding synchronization pit;

fifth means for generating a gate signal indicative of an area for recording said information by using the output signals of said photoreceptive member within a time period during which said light beam is applied onto said area between one of said synchronization pits and the succeeding synchronization pit, and wherein said tracking signal is held by using said gate signal in order to record information onto said area for recording between said synchronization pits; said second means including:

sixth means for producing pulse signals each representing respective edges of each of said synchronization pits on the basis of the output signals of said photoreceptive member;

seventh means, coupled to said sixth and first means, for obtaining the level of said difference signal at each time point at which respective pulse signals of said sixth means are produced; and eighth means, coupled to said seventh means, for deriving the difference between said levels as said tracking signal; and ninth means for generating pulse signals indicative of the length in the track direction of said synchronization pits on the basis of the sum of the output signals of said detection elements in said first to fourth quadrants; and tenth means, coupled to said ninth means, for generating a pulse signal at respective rise and all time points of said pulse signals of said ninth means.

6. An information recording and reproducing apparatus according to claim 5, further comprising eleventh means provided between said sixth and seventh means and further coupled to said fifth means, said ninth means being constructed so that the pulse signals of said sixth means are not supplied to said seventh means within a time period during which said gate signal of said fifth means is generated.

7. An information recording and reproducing apparatus including:

an optical disc having synchronization pits previously formed on a record medium in such a manner so as to permit optical detection, said synchronization pits forming a track in the rotation direction of said optical disc;

means for applying a light beam onto said optical disc through an optical system;

photo detecting means including a photoreceptive member for receiving said light beam reflected by said optical disc, said photoreceptive member being divided into four detection elements each disposed in the first to fourth quadrants defined by origin coinciding with the light axis of said optical system, an axis in parallel with said track, and an axis perpendicular to said track;

first means for producing a difference signal representing the difference between a signal which is the sum of the output signal from the detection element in said first quadrant and the output signal from the detection element in said third quadrant and a signal which is the sum of the output signal from the detection element in said second quadrant and the output signal from the detection element in said fourth quadrant;

second means, coupled to said first means, for providing a tracking signal on the basis of said difference signal, said tracking signal being used to track said synchronizing pits along said track;

third means, coupled to said second means, for controlling, in response to said tracking signal, the application position of said light beam so as to track said synchronization pits along the track;

fourth means for modulating said light beam by predetermined information within a time period during which said light beam is applied onto an area between one of said synchronization pits and the succeeding synchronization pit;

fifth means for generating a gate signal indicative of an area for recording said information by using the output signals of said photoreceptive member within a time period during which said light beam is applied onto said area between one of said synchronization pits and the succeeding synchronization pit, and wherein said tracking signal is held by using said gate signal in order to record information onto said area for recording between synchronization pits:

said second means including:

sixth means for producing pulse signals each representing respective edges of each of said synchronization pits on the basis of the output signals of said photoreceptive member;

seventh means, coupled to said sixth and first means, for obtaining the level of said difference signal at each time point at which respective pulse signals of said sixth means are produced; and eighth means, coupled to said seventh means, for deriving the difference between said levels as said tracking signal; and ninth means provided between said sixth and seventh means and further coupled to said fifth means, said ninth means being constructed so that the pulse signals of said sixth means are not supplied to said seventh means within a time period during which said gate signal of said fifth means is generated.

8. An information recording and reproducing apparatus according to claim 7, wherein said seventh means includes a sample and hold circuit, the pulse signal of said sixth means being a sampling control signal for said sample and hold circuit.

9. An information recording and reproducing apparatus comprising:

an optical disc having pre-pits previously formed on a record medium in such a manner as to permit optical detection, said pre-pits forming a track in the rotation direction of said optical disc;

means for applying a light beam onto said optical disc through an optical system;

photo detecting means including a photoreceptive member for receiving said light beam reflected by said optical disc, said photoreceptive member being divided into four detection elements each disposed in the first to fourth quadrants defined by an origin coinciding with the light axis of said optical system, an axis in parallel with said track, and an axis perpendicular to said track;

first means for producing a difference signal representing the difference between a signal which is the sum of the output signal from the detection element in said first quadrant and the output signal from the detection element in said third quadrant and a signal which is the sum of the output signal from the detection element in said second quadrant and the output signal from the detection element in said fourth quadrant;

second means coupled to said first means, for sampling the level of said difference signal at the edges of said pre-pits;

third means for producing sampling pulse signals for controlling the sampling operation of said second means on the basis of the output signals of said photoreceptive member;

fourth means for generating a gate signal indicative of an area for recording information by using the output signals of said photoreceptive member within a time period during which said light beam is applied onto said area between one of said pre-pits and the succeeding pre-pit;

fifth means provided between said second and third means and further coupled to said fourth means, said fifth means being constructed so that the sampling pulse signals of said third means are not supplied to said second means within a time period during which said gate signal of said fourth means is generated;

sixth means for producing a tracking signal on the basis of the output of said second means, said tracking signal being used to track said pre-pits along said track;

seventh means coupled to said sixth means, for controlling, in response to said tracking signal the application position of said light beam so as to track said pre-pits along the track; and eighth means for modulating said light beam by predetermined information within a time period during which said light beam is applied onto said area for recording information.

10. An information recording and reproducing apparatus according to claim 9, wherein said second means comprises a pair of sample and hold circuits.

11. An information recording and reproducing apparatus according to claim 10, wherein said third means comprises means for producing sampling pulse signals, each pulse signal representing a respective edge of each of said pre-pits on the basis of the output signals of said photoreceptive member.

12. An information recording and reproducing apparatus according to claim 11, wherein said third means comprises:

ninth means for generating pulse signals indicative of the length in the track direction of said pre-pits on the basis of the sum of the output signals of said detection elements in said first to fourth quadrants; and tenth means coupled to said ninth means, for generating a pulse signal at respective rise and fall time points of said pulse signals of said ninth means.

13. An information recording and reproducing apparatus according to claim 10, wherein said sixth means comprises means for deriving the difference between the outputs of said pair of sample and hold circuits.

14. An information recording and reproducing apparatus according to claim 11, wherein said fourth means comprises means for producing a pulse signal with a predetermined pulse width by using one of said sampling pulse signals.

* * * * *